United States Patent Office

2,707,709
NON-ELECTROSTATIC RESINOUS MOLDING COMPOSITIONS

Rolf Buchdahl, Longmeadow, and Massimo Baer, Springfield, Mass., assignors to Monsanto Chemical Company, St. Louis, Mo., a corporation of Delaware No Drawing. Application September 12, 1952,
Serial No. 309,384

6 Claims. (Cl. 260—45.5)

This invention relates to synthetic resinous molding compositions which are substantially non-susceptible to the accumulation of an electrostatic charge. More particularly, this invention relates to synthetic resinous molding compositions prepared from polymeric resins containing a major portion of monomer units derived from styrene, such compositions being substantially non-susceptible to the accumulation of an electrostatic charge.

The provision of styrene-containing resin compositions which will remain substantially non-susceptible to the accumulation of an electrostatic charge over prolonged periods of time has presented a serious problem, such resins being poor electrical conductors and having a low dielectric constant. It has been proposed to modify resins of this nature through the incorporation of various materials which act as destaticizers but, although many types of materials have been suggested and some improvement effected, there has still been much to be desired in the results obtained. Particular difficulty has been encountered in permanently destaticizing styrene-containing resin compositions and in homogeneously incorporating destaticizing materials into such resins.

Accordingly, an object of the present invention is the provision of styrene-containing resin compositions which are indefinitely substantially non-susceptible to the accumulation of an electrostatic charge.

Another object is the provision of styrene-containing resins having homogeneously incorporated therein compositions which render such resins indefinitely substantially non-susceptible to the accumulation of an electrostatic charge.

These and other objects are attained by homogeneously incorporating a destaticizing amount of an amine salt of a sulphonated polystyrene into a styrene-containing resin.

The following examples are given in illustration of this invention and are not intended as limitations on the scope thereof. Where parts are mentioned, they are parts by weight.

The sulphonated polystyrene used through the following examples had an average of 1.2 sulphonic groups per styrene unit and an average molecular weight of from about 65,000 to 75,000 as determined by the Staudinger equation.

Example I

A molding composition is prepared from 35 parts of the triethylamine salt of sulphonated polystyrene and 65 parts of polystyrene by incorporating the triethylamine salt into the polystyrene on the heated rolls of a rolling mill at a temperature of 130° C. Disks molded from the thus-prepared compositions on a compression molding machine possess excellent anti-static properties being substantially non-susceptible to the accumulation of an electrostatic charge. This is shown by rubbing a disk with a piece of felt cloth, bringing the disk into close proximity to the knob of an electroscope and then touching the knob. An electrostatic charge is not imparted to the leaves of the electroscope.

The triethylamine salt of sulphonated polystyrene is compatible with polystyrene and will not exude on standing. A material change in antistatic properties is not observable with the passage of time, no charge being imparted to the leaves of an electroscope when the electroscope test is repeated at the end of six months.

The mechanical properties of this molding composition compare favorably with the mechanical properties of unmodified polystyrene as evidenced by the fact that the disks prepared in the above manner had an average impact strength of 0.504 ft. lbs./inch, an average flexural strength of about 9500 p. s. i. and an average A. S. T. M. heat distortion of 85.5° C. (A. S. T. M. test D–648–45T).

Example II

A similar molding composition containing a substantially lesser amount of the destaticizing material is prepared by incorporating 20 parts of the triethylamine salt of sulphonated polystyrene into 80 parts of polystyrene on the heated rolls of a rolling mill at a temperature of 130° C. Disks are molded from the thus prepared composition on a compression molding machine. The disks impart a charge to the leaves of an electroscope, exhibiting only a slightly improved ability to dissipate an electrostatic charge as compared with unmodified polystyrene.

Example III

A mixture of 40 parts of the triamylamine salt of a sulphonated polystyrene and 60 parts of polystyrene are milled on the heated rolls of a rolling mill at a temperature of 130° C. in order to form a molding composition. Disks are molded from this composition on a compression molding machine and when the disks are tested with an electroscope they are found to be substantially non-susceptible to the accumulation of an electrostatic charge. Upon being measured, the mechanical properties of the disk are found to be similar to the mechanical properties of the disks of Example I.

Example IV

A dry blend of 35 parts of the dicyclohexylamine salt of sulphonated polystyrene in granular form and 65 parts of granular polystyrene is prepared and disks are formed from this composition using an injection molding machine. The mixture is softened by being heated to a temperature of about 250° C. in the barrel of the injection molding machine prior to injection into the mold. Disks prepared in this fashion are substantially non-susceptible to the accumulation of an electrostatic charge and will not impart a charge to the leaves of an electroscope. The mechanical properties of the disks are similar to the mechanical properties of the disks of Example I.

Example V

Disks are formed from a dry blend of 45 parts of a dicyclohexylamine salt of sulphonated polystyrene in granular form and 55 parts of granular polystyrene using an injection molding process wherein the dry blend is softened by being heated to a temperature of about 250° C. in the barrel of the injection molding machine prior to injection into the mold. The disks are likewise non-susceptible to the accumulation of an electrostatic charge but are more brittle than the disks formed from the composition of Example IV.

Example VI

A dry blend of 50 parts of the sodium salt of sulphonated polystyrene in granular form and 50 parts of granular polystyrene is prepared and molded into disks using an injection molding machine, the dry blend being heated to a temperature of about 250° C. in the barrel of the injection molding machine prior to injection into the mold. The disks will impart a charge to the leaves of an electroscope, are quite brittle and have poor mechanical properties. The sodium salt is not homogeneously incorporated into the polystyrene.

The resins which may be destaticized through the incorporation of the amine salts of sulphonated polystyrene are homopolymers of styrene and copolymers thereof in which at least about 50% of the monomer units are derived from styrene. A preferred form of the invention relates to styrene-containing resins which are useful as molding compositions, and accordingly, it is preferable that the polymers and copolymers have an average molecular weight of between about 40,000 and 90,000 as determined by the Staudinger equation.

Sulphonated polystyrene may be prepared from polystyrene itself or from polymers of styrene derivatives as, for example, polymethyl styrene. For reasons of economy it is preferable that polystyrene be used.

Convenionally known methods may be employed in preparing sulphonated polystyrene and sulphonated polystyrene derivatives as for example, the methods set forth in Baer Patents Nos. 2,533,210 and 2,533,211, and Soday Patent No. 2,283,236. It is preferable that the polystryene to be sulphonated have a molecular weight of between about 10,000 and 100,000 as determined by the Staudinger equation. The degree of sulphonation of the polystyrene will have some effect upon the mechanical properties of the molding compositions containing amine salts of sulphonated polystyrene. It is preferable that the sulphonated polystyrene have an average of from about 1.0 to 1.5 sulphonic groups per sytrene unit. When the sulphonated polystyrene has an average of more than about 1.2 sulphonic groups per styrene unit, the molding compositions will tend to be relatively brittle. However, this is largely compensated for by the fact that a lesser amount of amine salt is required in such a case. If the sulphonated polystyrene contains less than an average of about 1.2 sulphonic groups per styrene unit, a relatively larger amount of salt should be used.

Not all of the salts of sulphonated polystyrene may be used as destaticizers as is shown by the unsatisfactory results obtained in the case of Example VI wherein a sodium salt was used. The salts of sulphonated polystryene which are useful as destaticizers for styrene-containing resins are the amine salts which may be homogeneously blended with such resins in destaticizing amounts within a temperature range of from about 120° to about 275° C. The amine salts which may be incorporated into styrene-containing resins in this fashion are the salts having a softening point of below about 225° C. Illustrative of the amines which may be satisfactorily used to prepare amine salts of sulphonated polystyrene having softening points below this temperature are the di- and tri-alkyl amines having from 2 to 6 carbon atoms in each alkyl group such as triethylamine, tripropylamine, di- or tributylamine, di- or triamylamine, di- or trihexylamine, etc.; cyclic amines such as dicyclohexylamine, diprenylamine, 2,5-dichloraniline, etc.; monoalkyl amines having from 7 to 15 carbon atoms in the chain such as octylamine, dodecylamine, tetradecylamine, etc. The di- and trialkylamines having from 2 to 6 carbon atoms in each alkyl group constitute a preferred class of compounds due to the fact that the amine salts of sulphonated polystyrene prepared from this class of compounds soften and flow at temperatures near or below 100° C. They are relatively more compatible with styrene-containing resins than the other amine salts and may be readily incorporated into such resins over a wider range of temperatures. The amine salts of sulphonated polystyrene may be used alone or two or more of the salts may be used if desired.

The amine salts of sulphonated polystyrene are conveniently prepared by dissolving sulphonated polystyrene in a suitable solvent such as water or an alcohol and neutralizing the solution with the desired amine, the amine salt being recovered by evaporation of the solvent. As a specific example, the triamylamine salt of sulphonated polystyrene is prepared by dissolving sulphonated polystyrene in methanol and neutralizing the solution to a pH of between 6 and 7 with triamylamine. The salt is recovered by evaporation of the methanol.

It is necessary that the amine salt of sulphonated polystyrene be homogeneously incorporated into the styrene-containing resin in order to prepare products which are substantially non-susceptible to the accumulation of an electrostatic charge. In order to prepare homogeneous mixtures, it is necessary that both the styrene-containing resin and the amine salt be in a softened malaxable condition at the time the amine salt is premanently incorporated into the resin. Both styrene-containing resins and amine salts of sulphonated polystyrene are thermoplastic materials and, as a result, the amine salts may be satisfactorily incorporated into styrene-containing resins over a wide range of temperatures.

Any suitable machine may be used to incorporate the amine salt into the resin such as, for example, a rolling mill, an extruder, an injection molding machine, etc. The type of machine to be used will depend upon the type of produce which is to be prepared and the softening point of the amines which are used. Thus, the triethylamine salt of sulphonated polystyrene used in Example I softens and flows at a temperature of about 100° C. and the triamylamine salt of Example III is likewise soft and flowable at a temperature of 100° C. As a result, these salts are conveniently incorporated into styrene-containing resins on a rolling mill wherein temperatures of between about 100° C. and 150° C. are normally employed. The dicyclohexylamine salt of Examples IV and V is a pale yellow solid at room temperature and softens at a temperature of about 225° C. Accordingly, when this salt is used, an injection molding machine is particularly suitable because temperatures in excess of 200° C. are normally used therein.

Effective resistance of the accumulation of an electrostatic charge will generally not be obtained when the amine salt constitutes less than about 30% of the combined weight of amine salt and styrene-containing resin. When more than about 50% of the mixtures consists of the amine salt, articles molded from the composition will tend to be dull in color and brittle.

The molding compositions of the present invention may be modified by the addition of conventional ingredients such as plasticizers, pigments, dyes, fillers, lubricants, etc.

It is obvious that many variations may be made in the products of this invention without departing from the spirit and scope thereof as defined by the appended claims.

What is claimed is:

1. A composition of matter comprising from about 70 to 50 parts of polystyrene having homogeneously incorporated therein from about 30 to 50 parts of an amine salt of sulphonated polystyrene, said amine salt having a softening point of less than about 225° C.

2. A composition of matter as in claim 1 wherein the amine salt is an alkylamine salt of a sulphonated polystyrene, the alkylamine being taken from the group consisting of di- and tri-alkylamines having from 2 to 6 carbon atoms in each alkyl group.

3. A composition of matter as in claim 2 wherein the alkylamine salt is a triethylamine salt of sulphonated polystyrene.

4. A composition of matter as in claim 2 wherein the alkylamine salt is a triamylamine salt of a sulphonated polystyrene.

5. A composition of matter as in claim 1 wherein the amine salt is a cyclic amine salt of sulphonated polystyrene.

6. A composition of matter as in claim 5 wherein the cyclic amine salt is a dicyclohexylamine salt of a sulphonated polystyrene.

References Cited in the file of this patent

UNITED STATES PATENTS

| | | |
|---|---|---|
| 2,031,929 | Breuers et al. | Feb. 25, 1936 |
| 2,283,236 | Soday | May 19, 1942 |
| 2,676,896 | Cohen et al. | Apr. 27, 1954 |